US012152201B2

United States Patent
Hong et al.

(10) Patent No.: US 12,152,201 B2
(45) Date of Patent: Nov. 26, 2024

(54) METHOD OF CONVERTING HYDROCARBON USING PST-32 AND PST-2 ZEOLITE CATALYSTS

(71) Applicants: POSTECH Research and Business Development Foundation, Pohang (KR); Korea Research Institute of Chemical Technology, Daejeon (KR)

(72) Inventors: Suk Bong Hong, Pohang (KR); Hwajun Lee, Daegu (KR); Jiho Shin, Daejeon (KR); Na Young Kang, Daejeon (KR); Yong-Ki Park, Daejeon (KR)

(73) Assignees: POSTECH RESEARCH AND BUSINESS DEVELOPMENT FOUNDATION, Pohang (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 17/817,289

(22) Filed: Aug. 3, 2022

(65) Prior Publication Data
US 2023/0046197 A1 Feb. 16, 2023

(30) Foreign Application Priority Data
Aug. 3, 2021 (KR) .................. 10-2021-0101766

(51) Int. Cl.
C10G 11/05 (2006.01)

(52) U.S. Cl.
CPC ...... C10G 11/05 (2013.01); *C10G 2300/1055* (2013.01); *C10G 2400/20* (2013.01)

(58) Field of Classification Search
CPC ............ C10G 11/05; C10G 2300/1055; C10G 2400/20
See application file for complete search history.

(56) References Cited

U.S. PATENT DOCUMENTS

| | | | |
|---|---|---|---|
| 3,402,996 A * | 9/1968 | Maher | B01J 29/084 502/79 |
| 4,192,770 A | 3/1980 | Singleton | |
| 5,071,539 A | 12/1991 | Hayward et al. | |
| 2004/0054247 A1 | 3/2004 | Powers | |
| 2004/0152584 A1 * | 8/2004 | Ou | C01G 19/006 502/64 |
| 2004/0262200 A1 * | 12/2004 | Sughure, II | B01J 20/08 502/64 |
| 2006/0058562 A1 | 3/2006 | Choi et al. | |
| 2006/0207917 A1 * | 9/2006 | Domokos | C10G 47/06 502/67 |
| 2007/0015658 A1 * | 1/2007 | Turaga | B01J 20/02 502/400 |
| 2010/0267548 A1 * | 10/2010 | Andersen | B01D 53/56 423/213.2 |
| 2012/0184429 A1 * | 7/2012 | Andersen | B01D 53/9418 502/61 |
| 2016/0102032 A1 | 4/2016 | Du et al. | |
| 2016/0168484 A1 * | 6/2016 | Weigel | B01J 31/125 208/310 R |
| 2016/0326438 A1 | 11/2016 | Sorensen et al. | |
| 2018/0036710 A1 * | 2/2018 | Hong | B01J 20/3057 |
| 2018/0043305 A1 * | 2/2018 | Voss | B01D 53/9477 |
| 2018/0161743 A1 * | 6/2018 | McCarthy | C10G 51/06 |

FOREIGN PATENT DOCUMENTS

| | | | | |
|---|---|---|---|---|
| EP | 0909804 A2 | 4/1999 | | |
| KR | 100904297 B1 | 6/2009 | | |
| KR | 20170034791 A | 3/2017 | | |
| KR | 20210037773 A | * | 4/2021 | ........... C07C 15/085 |

OTHER PUBLICATIONS

Lee, H. et al., "Synthesis of thermally stable SBT and SBS/SBT intergrowth zeolites," Science, vol. 373, No. 6550, Jul. 2, 2021, 5 pages.
Korean Intellectual Property Office, Office Action Issued in Application No. 10-2021-0101766, Mar. 30, 2023, 11 pages.

* cited by examiner

*Primary Examiner* — Michelle Stein
(74) *Attorney, Agent, or Firm* — McCoy Russell LLP

(57) ABSTRACT

Provided is a method of converting a hydrocarbon using a catalyst/catalyst support including a PST-32 or PST-2 zeolite, which has an effect of increasing the selectivity/yield of a light olefin product and reducing a side reaction to sustain catalytic activity, in various hydrocarbon conversion reactions, in particular, catalytic cracking of diesel.

12 Claims, 1 Drawing Sheet

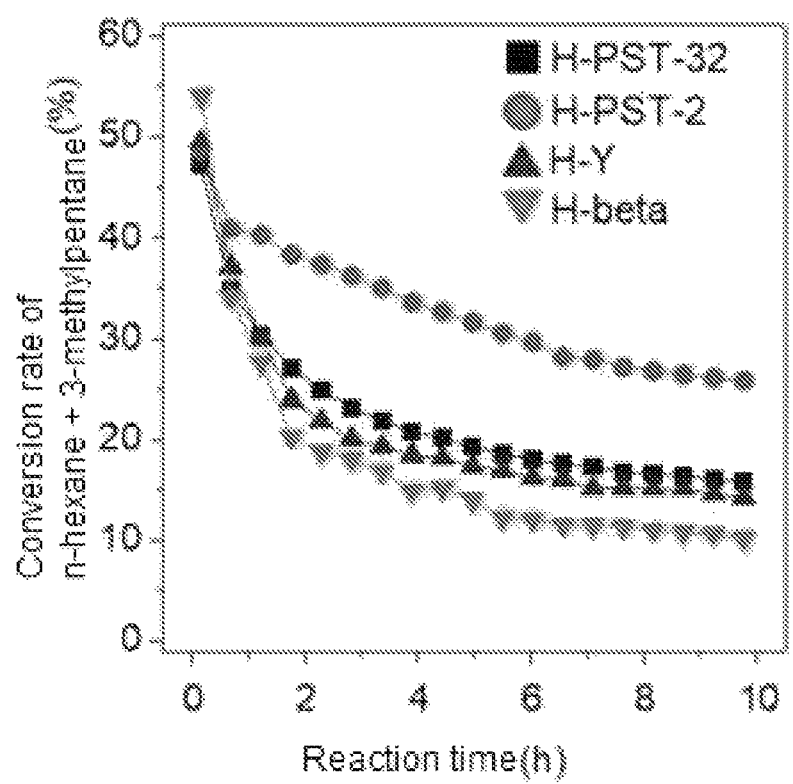

METHOD OF CONVERTING HYDROCARBON USING PST-32 AND PST-2 ZEOLITE CATALYSTS

CROSS-REFERENCE TO RELATED APPLICATIONS

The present application claims priority to Korean Patent Application No. 10-2021-0101766, filed on Aug. 3, 2021. The entire contents of the above-listed application are hereby incorporated by reference for all purposes.

TECHNICAL FIELD

The following disclosure relates to a method of preparing a light olefin by a diesel catalytic cracking reaction, using PST-32 and PST-2 zeolites as a catalyst or a catalyst support.

BACKGROUND

Zeolite is a crystal material in which silicon or aluminum is bonded to an oxygen atom to form a tetrahedral structure, which is regularly arranged to form a three-dimensional structure. Zeolites have pores having a certain size and shape, and thus, zeolites have a specific surface area corresponding to hundreds of square meters per unit gram. In addition, due to the charge imbalance of silicon and aluminum, a Bronsted acid site is produced, and when firing is performed at a high temperature, a Lewis acid site is produced. Since zeolites have various sizes and shapes of pores depending on the type and may adjust an acid site amount or intensity widely, it is currently widely used as various catalysts, ion exchangers, and adsorbent-separators in the field of environmental and energy chemistry. In particular, since various hydrocarbon conversion processes using a zeolite as a catalyst or a catalyst support have been developed, its importance as a catalyst of the zeolite is further highlighted.

Usually, the size of zeolite pores may be inferred from the number of oxygen atoms of the opening of the pores, and in general, pores formed of rings of 8, 10, and 12 oxygen atoms have a size of 3-4.5/4.5-6/6-8 Å, and each of these is classified into small pore/medium pore/large pore zeolite. Among them, a large pore zeolite in which the opening of pores is formed of a ring of 12 oxygen atoms may allow diffusion of relatively large molecules into the pores and easy access of a reactant to the acid site or the metal site of a zeolite. In addition, since a product may rapidly move out of the pores, a second side product may occur less, which leads to less pore blockage due to by-products, in particular, carbon deposition, and thus, its industrial utility is high. As an example, zeolite X(Si/Al ratio<1.5) and zeolite Y(Si/Al ratio>1.5) having a FAU structure of large pores are used as a commercial separator for separating nitrogen and oxygen in the air and a commercial catalyst of a catalytic cracking reaction of a light oil, respectively.

Meanwhile, there are only about 250 structures of zeolites approved by the International Zeolite Association, and about 20 structures of zeolites are actually commercially used. The primary constraint for the commercial application of zeolites is the structure and the pore size of zeolites, and also, an acidity, hydrothermal stability, and the like related to a zeolite composition are also the main factors determining availability. In this regard, synthesis of a zeolite having a new structure or composition which is not found in conventional zeolites increases the energy efficiency of a process using conventional zeolites to reduce carbon dioxide emissions.

Therefore, development of a catalyst and a catalyst support which have excellent thermal stability, may stably maintain the structure even after removing an organic structure inducer remaining in the zeolite after synthesis, and may be used as an acid catalyst is demanded.

SUMMARY

An embodiment of the present disclosure is directed to providing a method of converting a hydrocarbon using a catalyst and a catalyst support including PST-32 or PST-2 zeolite.

Another embodiment of the present disclosure is directed to providing a method which may be applied to a conversion reaction of various hydrocarbons and catalytically crack diesel to increase the selectivity/yield of a light olefin product.

In one general aspect, a method of preparing a light olefin includes: (a) filling a reactor with a catalyst including a porous zeolite which contains aluminum oxide ($Al_2O_3$) and silicon dioxide ($SiO_2$) at a mole ratio of 1:2 to 1:2000 and has a SBT framework structure; (b) injecting a hydrocarbon raw material into the reactor; and (c) catalytically cracking the hydrocarbon raw material.

In the method of preparing a light olefin according to an exemplary embodiment of the present disclosure, the structure of the porous zeolite may be an intergrowth structure of a SBT framework structure and a SBS framework structure.

In the method of preparing a light olefin according to an exemplary embodiment of the present disclosure, the porous zeolite may further contain $M_{2/n}O$ (wherein M is a metal element and n is a charge quantity of M) and may contain $M_{2/n}O$ and aluminum oxide($Al_2O_3$) at a mole ratio of 0.1:1 to 10:1, and M may be selected from the group consisting of Li, Na, K, Rb, and Cs.

In the method of preparing a light olefin according to an exemplary embodiment of the present disclosure, the reactor may be selected from the group consisting of a fluidized bed reactor, a moving bed reactor, and a fluidized bed reactor.

In the method of preparing a light olefin according to an exemplary embodiment of the present disclosure, the hydrocarbon raw material may have 20 or fewer carbons, and the hydrocarbon raw material having 20 or fewer carbons may be diesel.

In the method of preparing a light olefin according to an exemplary embodiment of the present disclosure, the light olefin may be ethylene or propylene.

BRIEF DESCRIPTION OF THE FIGURES

FIG. 1 is a graph showing conversion rates of normal hexane and 3-methylpentane over time, when each catalyst was used.

DETAILED DESCRIPTION

Hereinafter, a catalyst for converting a hydrocarbon of the present disclosure and a method of preparing a light olefin using the same will be described in detail, with reference to the attached drawings.

The drawing to be provided below is provided by way of example so that the spirit of the present disclosure can be sufficiently transferred to a person skilled in the art to which the present disclosure pertains. Therefore, the present disclosure is not limited to the drawing provided below but may be embodied in many different forms, and the drawing suggested below may be exaggerated in order to clear the spirit of the present disclosure.

Technical terms and scientific terms used herein have the general meaning understood by those skilled in the art to which the present disclosure pertains, unless otherwise defined, and the description for the known function and configuration which may unnecessarily obscure the gist of the present disclosure will be omitted in the following description and the accompanying drawings.

In addition, the singular form used in the specification and claims appended thereto may be intended to include a plural form also, unless otherwise indicated in the context.

In the present specification and the appended claims, the terms such as "first" and "second" are not used in a limited meaning but used for the purpose of distinguishing one constituent element from other constituent elements.

In the present specification and the appended claims, the terms such as "comprise" or "have" mean that there is a characteristic or a constituent element described in the specification, and as long as it is not particularly limited, a possibility of adding one or more other characteristics or constituent elements is not excluded in advance.

In the present specification and the appended claims, when a portion such as a membrane (layer), a region, and a constituent element is present on another portion, not only a case in which the portion is in contact with and directly on another portion but also a case in which other membranes (layers), other regions, other constitutional elements are interposed between the portions is included.

The present disclosure provides a method of preparing a light olefin including: (a) filling a reactor with a catalyst including a porous zeolite which contains aluminum oxide ($Al_2O_3$) and silicon dioxide ($SiO_2$) at a mole ratio of 1:2 to 1:2000 and has a SBT framework structure; (b) injecting a hydrocarbon raw material into the reactor; and (c) catalytically cracking the hydrocarbon raw material.

In a specific example, the porous zeolite of step (a) may have a SBT framework structure. Here, the SBT framework structure is a large pore zeolite structure belonging to a space group of a trigonal crystal system R-3m based on a cage in which the pore opening is formed of a ring of 12 oxygen atoms, and since it allows diffusion of relatively large molecules into the pores, easy access of a reactant to the acid site or metal site of the zeolite, and rapid movement of a product out of the pores, pore blockage by by-products occurs less.

Crystal axis unit cell lengths a and b of the SBT framework structure may be 17.0 to 18.5 Å, specifically 17.0 to 18.0 Å, and most specifically 17.0 to 17.5 Å, respectively, but are not limited thereto. In addition, a crystal axis unit cell length c of the SBT framework structure may be 41.0 to 42.5 Å, specifically 41.0 to 42.0 Å, but is not limited thereto.

When a zeolite having an alumino silicate composition is introduced to the SBT framework structure having the advantage described above, it may be used as a catalyst, an adsorbent, and a separator which allow diffusion of relatively large molecules to pores and rapid movement of a product out of the pores, and also, have thermal stability.

In a specific example, the porous zeolite may have a coexisting structure of the SBT framework structure and a SBS framework structure (SBS/SBT intergrowth). Here, the SBS framework structure refers to a large pore zeolite structure belonging to a space group of a hexagonal crystal system P63/mmc based on a cage in which the opening of pores is formed of a ring of 12 oxygen atoms.

Crystal axis unit cell lengths a and b of the SBS framework structure may be 17.0 to 18.5 Å, specifically 17.0 to 18.0 Å, and most specifically 17.0 to 17.5 Å, respectively, but are not limited thereto. In addition, a crystal axis unit cell length c of the SBS framework structure may be 25.0 to 30.0 Å, specifically 26.0 to 28.0 Å, but is not limited thereto.

The SBS structure and the SBT structure are formed of an octagonal hexagonal column (double 6-ring) and a hendecahedral cancrinite structural unit, and zeolites are classified into the SBS structure and the SBT structure depending on their arrangement method. Here, there may be a zeolite having both the arrangements of the structural units without a certain rule within a crystal, and this is referred to as an intergrowth structure.

Though the porous zeolite has both the SBS structure and the SBT structure, it is not a simple physical mixture of the zeolites having the SBS structure and the SBT structure, and thus, physicochemical properties different from those of the zeolites having the SBS structure and the SBT structure may be expressed.

When a zeolite having an alumino silicate composition is introduced to the SBS/SBT intergrowth structure having the advantage described above, it may be used as a catalyst, an adsorbent, and a separator which allow diffusion of relatively large molecules to pores and rapid movement of a product out of the pores, and also, have thermal stability.

In a specific example, in the porous zeolite, $Al_2O_3$ and $SiO_2$ may be contained at a mole ratio of 1:2 to 1:2000, specifically 1:2 to 1:50, and most specifically 1:2 to 1:20, but is not limited thereto. The porous zeolite containing $Al_2O_3$ and $SiO_2$ at the mole ratio described above may solve the problems in which thermal stability and hydrothermal stability are deteriorated due to excessive aluminum in the zeolite or the number of zeolite strong acid sites produced by aluminum is decreased to deteriorate catalytic activity.

In a specific example, the porous zeolite may further contain $M_{2/n}O$.

M used in the porous zeolite may be a metal element, and more specifically, a monovalent metal, wherein the monovalent metal may be an alkali metal. The alkali metal may be selected from Li, Na, K, Rb, and Cs, but is not limited thereto. In addition, in $M_{2/n}O$, n refers to a charge quantity of M.

In addition, in the porous zeolite, $M_{2/n}O$ and $Al_2O_3$ may be contained at a mole ratio of 0.1:1 to 10:1, specifically 0.1:1 to 5:1, and most specifically 0.1:1 to 2:1, but is not limited thereto. The porous zeolite containing $M_{2/n}O$ and $Al_2O_3$ at the mole ratio described above may have high thermal stability.

In a specific example, in the catalyst including the porous zeolite, the porous zeolite may be included at 1 to 70 wt %, specifically 10 to 70 wt %, more specifically 20 to 60 wt %, still more specifically 30 to 50 wt %, and most specifically 30 to 40 wt %, with respect to 100 wt % of the catalyst. Within the range, the excellent stability of the catalyst and the high yield of the light olefin may be implemented, but are not necessarily limited thereto.

In addition, the catalyst including the porous zeolite may have an average particle diameter of 50 to 300 μm, specifically 50 to 200 μm, and most specifically 75 to 200 μm, and the efficiency of the method of preparing a light olefin may be maximized with the size as such.

In addition, the porous zeolite may be mixed with an inorganic binder to form a zeolite molded catalyst. Here, an amount of the inorganic binder may be 20 to 80 wt % with respect to the total amount of the zeolite including the binder. Catalyst molding may be performed in various shapes, and the method may include extrudation, pelletizing, rotational spherical forming, spray drying, and the like, but is not particularly limited thereto. The inorganic binder used in catalyst molding may be selected from the group consisting of clay, alumina ($Al_2O_3$), silica ($SiO_2$), silica-alumina ($SiO_2$—$Al_2O_3$), metal oxides, metal phosphates, and mixtures thereof, but is not limited thereto. Meanwhile, the clay may include montmorillonite, saponite, kaolin, clinoptilolite, bentonite, and the like, without limitation, but is not limited thereto.

In addition, the porous zeolite may have phosphorus supported in the pores of the zeolite and/or on the surface of the zeolite, by treating the zeolite catalyst with a phosphorus-containing compound, for preventing irreversible de-aluminum. When phosphorus is supported, hydrothermal stability of aluminum in the framework is increased and a strong acid site is weakened to make an acid site having a medium intensity.

In addition, the catalyst including the porous zeolite may be a catalyst for a hydrocarbon catalytic reaction, and the hydrocarbon may be all hydrocarbons such as methane, naphtha, kerosene, diesel, and heavy oil, and more specifically, hydrocarbons having 20 or fewer carbons, wherein the hydrocarbon having 20 or fewer carbons may be diesel.

In a specific example, the reactor of step (a) may be selected from the group consisting of a fixed bed reactor, a moving bed reactor, and a fluidized bed reactor, and operated.

In a specific example, a method of preparing a light olefin by catalytic cracking of a hydrocarbon raw material includes all reactions of converting various hydrocarbons as a reactant into light olefins. The hydrocarbon as a reactant may be all hydrocarbons such as methane, naphtha, kerosene, diesel, and heavy oil, and more specifically, hydrocarbons having 20 or fewer carbons, wherein the hydrocarbon having 20 or fewer carbons may be diesel. Since the hydrocarbon may be catalytically cracked in the reactor to produce a light olefin in a high yield with high economic feasibility, and the catalyst shows excellent mechanical strength, the catalyst may be used as a catalyst of a process of preparing a light olefin based on a fluidized bed reactor as well as a fluidized bed reactor.

In a specific example, the light olefin prepared may include ethylene or propylene, but is not limited thereto.

In the present disclosure, an example of the hydrocarbon conversion reaction which may use the porous zeolite as a catalyst/catalyst support is as follows, but is not limited thereto.

The catalyst according to the present disclosure may be used in the catalytic cracking reaction of naphtha/gasoline (C5-C10), kerosene (C10-C16), diesel (C10-C20), or heavy oil (C20-C50).

In addition, the catalyst may be used in a catalytic cracking reaction of a high molecular weight hydrocarbon into a low molecular weight hydrocarbon, a hydrocracking reaction in which hydrogen is added to crack a high molecular weight hydrocarbon such as a heavy oil, an alkyl exchange reaction of an aromatic hydrocarbon in the presence of a polyalkyl aromatic hydrocarbon, an isomerization reaction of an aromatic such as xylene, a skeletal isomerization reaction of preparing a branched iso-butene from n-butane which is paraffin or n-butene, an alkylation reaction of an aromatic hydrocarbon (benzene and alkylbenzene) in the presence of an alkylating agent (C1-C20 olefins, formaldehyde, halogenated alky, and alcohol), an alkylation reaction of an aromatic hydrocarbon (benzene) by a long-chain olefin (C14 olefin), a preparation reaction of an alkyl aromatic compound by an alkylation reaction of an aromatic hydrocarbon in the presence of a light olefin (ethylene, propylene) (preparation of cumene by an alkylation reaction of propylene and benzene), an alkylation reaction of phenol from olefin or an equivalent amount of alcohol, a conversion reaction from a light paraffin into an olefin and/or an aromatic, a conversion reaction from a light olefin into a hydrocarbon in a range of naphtha/gasoline, kerosene, and diesel, a hydrogenated dewax reaction, a mixed ether preparation reaction from alcohol and olefin (preparation of methyl-t-butyl ether (MTBE) and/or t-amyl-methyl ether (TAME) by a reaction of methanol with isobutene and/or isopentene), a disproportionation reaction of an aromatic (preparation of benzene and p-xylene by a disproportionation reaction of toluene), a conversion reaction from naphtha and similar mixtures into a branched hydrocarbon mixture having a high octane number, an adsorption reaction of an alkyl aromatic compound for separating various isomers of the compound, a conversion reaction from a light compound containing oxygen (alcohol such as methanol, ether such as dimethyl ether, or a mixture thereof) into an olefin and an aromatic compound, and an oligomerization reaction of linear and branched olefins having 2 to 5 carbon atoms.

Hereinafter, the present disclosure will be described in detail by the examples. However, the examples are for describing the present disclosure in more detail, and the scope of the present disclosure is not limited to the following examples.

Example 1: Preparation of PST-32 Zeolite

First, 1 mol of 1,4-diazabicyclo[2.2.2]octane was reacted with 2 mol of methyl iodide to obtain N,N'-dimethyl-diazabicyclo[2.2.2]octane diiodide (hereinafter, referred to as $Me_2$-DABCO diiodide), and a synthetic resin was used to synthesize an organic structure-derived material (($Me_2$-DABCO)$OH_2$) converted into a hydroxide form.

0.48 g of 50 wt % sodium hydroxide (NaOH) and 0.60 g of 50 wt % cesium hydroxide (CsOH) were added to 2.97 g of tertiary distilled water in a plastic beaker, 6.00 g of colloidal silica sol was slowly added to an aqueous solution obtained by adding 0.72 g of sodium aluminate ($Na_2O \cdot Al_2O_3 \cdot 0.8H_2O$) and performing stirring for 1 hour, stirring was performed for 1 hour, and finally, 2.29 g of 8.62 g of ($Me_2$-DABCO)$OH_2$ was added and stirring was performed for 24 hours to obtain a reaction mixture having a composition represented by the following Chemical Formula 1:

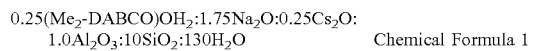

$0.25(Me_2\text{-DABCO})OH_2:1.75Na_2O:0.25Cs_2O: 1.0Al_2O_3:10SiO_2:130H_2O$    Chemical Formula 1

The reaction mixture obtained above was transferred into a Teflon reactor, added to a container made of stainless steel again, and heated at 120° C. for 14 days to obtain a solid product, which was washed repeatedly with water and dried at room temperature. In order to impart catalytic characteristics to a zeolite obtained as described above, the zeolite was fired in the air at 550° C. for 8 hours and added to a 1.0 M ammonium nitrate ($NH_4NO_3$) solution at a ratio of 50 ml per 1 g of the zeolite, and ion exchange was performed repeatedly four times at 80° for 6 hours to obtain a solid product, which was washed repeatedly with water, dried at room temperature, and fired in the air at 550° C. for 4 hours to synthesize a zeolite catalyst.

Example 2: Preparation of PST-2 Zeolite

To an aqueous solution obtained by adding 0.51 g of aluminum hydroxide (Al(OH)$_3$) to 6.73 g of tetraethylammonium hydroxide (TEAOH, 35 wt %) in a plastic beaker and performing stirring for 1 hour, 2.40 g of colloidal silica sol and 2.92 g of tertiary distilled water were added, stirring was performed for 1 hour, and the solution was aged at 80° C. for 18 hours. Finally, 0.20 g of cesium nitrate (CsNO₃) was added, and stirring was performed for 24 hours to obtain a reaction mixture having a composition represented by the following Chemical Formula 2:

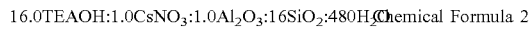
Chemical Formula 2

Subsequently, the reaction mixture obtained above was transferred into a Teflon reactor, added to a container made of stainless steel again, and stirring at 100° C. and heating for 14 hours were performed to obtain a solid product, which was washed repeatedly with water and dried at room temperature. In order to impart catalytic characteristics to a zeolite obtained as described above, the zeolite was fired in the air at 550° C. for 8 hours and added to a 1.0 M ammonium nitrate (NH₄NO₃) solution at a ratio of 50 ml per 1 g of the zeolite, and ion exchange was performed repeatedly four times at 80° for 6 hours to obtain a solid product, which was washed repeatedly with water, dried at room temperature, and fired in the air at 550° C. for 4 hours to synthesize a zeolite catalyst.

Comparative Example 1: Zeolite Y Catalyst

A large pore zeolite Y (Si/Al=5) supplied by Albermarle was used instead of the PST-32 zeolite catalyst prepared in Example 1.

Comparative Example 2: Zeolite Beta Catalyst

A large pore zeolite Beta (Si/Al=12.5) supplied by Zeolyst was used instead of the PST-32 zeolite catalyst prepared in Example 1.

Experimental Example 1: Diesel Catalytic Cracking Reaction

The performance of the catalysts prepared in Examples 1 and 2 and Comparative Examples 1 and 2 for a catalytic cracking reaction was confirmed using a fixed bed reactor.

A reactor was filled with 0.1 g of the catalyst, and a pretreatment was performed at 600° C. at a flow rate of a nitrogen of 100 mL/min for 2 hours. Subsequently, diesel (b.p. 65-467° C.) was injected as a reactant at a rate of 1.6 g/h with nitrogen, and the reaction was performed at a reaction temperature of 600° C., a reaction time of 10 minutes, and a reaction pressure of 1 bar.

TABLE 1

|  | Example 1 | Example 2 | Comparative Example 1 | Comparative Example 2 |
|---|---|---|---|---|
| Catalyst | PST-32 | PST-2 | Zeolite Y | Zeolite Beta |
| Conversion rate | 40 | 45 | 37 | 37 |
| Gas product (wt %) |  |  |  |  |
| Ethylene | 9.9 | 10.6 | 6.4 | 5.8 |
| Propylene | 11.4 | 7.3 | 7.0 | 6.7 |
| Ethylene + propylene | 21.3 | 17.9 | 13.4 | 12.5 |
| Selectivity (%) |  |  |  |  |
| Ethylene | 24.8 | 23.6 | 17.3 | 15.7 |
| Propylene | 28.5 | 18.2 | 18.9 | 18.1 |

It was confirmed that the PST 32 and the PST-2 zeolites prepared in the present disclosure showed much higher light olefin (ethylene, propylene) yields than zeolite Y and zeolite Beta in the catalytic cracking reaction of diesel.

More specifically, it was confirmed that an ethylene yield was increased by about 1.55 to 1.83 times, a propylene yield was increased by about 1.04 to 1.70 times, and a light olefin yield (sum of ethylene and propylene) was increased by about 1.34 to 1.70 times in Examples 1 and 2, as compared with Comparative Examples 1 and 2.

In addition, it was confirmed that an ethylene selectivity was increased by about 1.36 to 1.58 times and a propylene yield was increased by up to 1.57 times in Examples 1 and 2, as compared with Comparative Examples 1 and 2.

From the results, it was found that the PST-32 and the PST-2 zeolites have excellent catalytic ability in the catalytic cracking reaction of diesel, and it means that the PST-32 and the PST-2 zeolites may provide a use as a useful catalyst in various hydrocarbon catalytic cracking reaction processes including the process.

Experimental Example 2: Catalytic Cracking Reaction of Mixture of n-Hexane and 3-Methylpentane A catalytic cracking reaction of a mixture of a n-hexane and 3-methylpentane was performed with 1.0 mL of the catalyst at 316° C. at a liquid space velocity per hour of 1.0 at a mole ratio of a mixture of n-hexane and 3-methylpentane of 4.0 for 10 hours in the atmospheric pressure, and the results are shown in FIG. 1.

It was confirmed that the PST-32 and the PST-2 zeolites of the present disclosure showed a better conversion rates of n-hexane and 3-methylpentane than Y and Beta zeolites in the catalytic cracking reaction of the mixture of n-hexane and 3-methylpentane.

The catalyst for preparing a light olefin of the present disclosure may show mechanical strength at an appropriate level to be applied to a fluidized bed, while showing an excellent light olefin yield. In addition, the catalyst may be used for a long time, and allows economical production of a light olefin by an industrially advantageous fluidized bed reactor.

The present disclosure relates to a method of converting a hydrocarbon using a catalyst/catalyst support including a PST-32 or PST-2 zeolite, which has an effect of increasing the selectivity/yield of a light olefin product and reducing a side reaction to sustain catalytic activity, in various hydrocarbon conversion reactions, in particular, catalytic cracking of diesel.

The invention claimed is:

1. A method of preparing a light olefin, the method comprising:
   (a) filling a reactor with a catalyst including a porous zeolite which contains aluminum oxide (Al₂O₃) and silicon dioxide (SiO₂) at a mole ratio of 1:2 to 1:2000 and has a SBT framework structure;
   (b) injecting a hydrocarbon raw material into the reactor; and
   (c) catalytically cracking the hydrocarbon raw material;
   wherein the light olefin is ethylene or propylene;
   wherein the porous zeolite is PST-32 or PST-2;
   wherein the PST-32 is synthesized by firing a zeolite for the PST-32 in the air at 550° C. for 8 hours, adding the zeolite for the PST-32 to a 1.0 M ammonium nitrate (NH₄NO₃) solution at a ratio of 50 ml per 1 g of the zeolite for the PST-32, and performing an ion exchange repeatedly four times at 80° for 6 hours to obtain a solid product, which is washed repeatedly with water, dried at room temperature, and fired in the air at 550° C. for 4 hours;

wherein the zeolite for the PST-32 is obtained by heating a reaction mixture of [Chemical Formula 1] at 120° C. for 14 days, washing with water, and drying at room temperature:

$$0.25(Me_2\text{-DABCO})OH_2 : 1.75 Na_2O : 0.25 Cs_2O : 1.0 Al_2O_3 : 10 SiO_2 : 130 H_2O; \quad \text{Chemical Formula 1}$$

wherein the PST-2 is synthesized by firing a zeolite for the PST-2 in the air at 550° C. for 8 hours, adding the zeolite for the PST-2 to a 1.0 M ammonium nitrate ($NH_4NO_3$) solution at a ratio of 50 ml per 1 g of the zeolite for the PST-2, and performing an ion exchange repeatedly four times at 80° for 6 hours to obtain a solid product, which is washed repeatedly with water, dried at room temperature, and fired in the air at 550° C. for 4 hours; and wherein the zeolite for the PST-2 is obtained by heating a reaction mixture of [Chemical Formula 2] at 100° C. for 14 days, washing with water, and drying at room temperature:

$$16.0 TEAOH : 1.0 CsNO_3 : 1.0 Al_2O_3 : 16 SiO_2 : 480 H_2O; \quad \text{Chemical Formula 2}$$

wherein TEAOH is tetraethylammonium hydroxide.

2. The method of preparing a light olefin of claim 1, wherein the structure of the porous zeolite has an intergrowth structure of a SBT framework structure and a SBS framework structure.

3. The method of preparing a light olefin of claim 1, wherein the porous zeolite further contains $M_{2/n}O$ (wherein M is a metal element and n is a charge quantity of M).

4. The method of preparing a light olefin of claim 3, wherein the porous zeolite contains the $M_{2/n}O$ and the aluminum oxide ($Al_2O_3$) at a mole ratio of 0.1:1 to 10:1.

5. The method of preparing a light olefin of claim 3, wherein M is selected from the group consisting of Li, Na, K, Rb, and Cs.

6. The method of preparing a light olefin of claim 1, wherein the reactor is selected from the group consisting of a fluidized bed reactor, a moving bed reactor, and a fixed bed reactor.

7. The method of preparing a light olefin of claim 1, wherein the hydrocarbon raw material has 20 or fewer carbons.

8. The method of preparing a light olefin of claim 7, wherein the hydrocarbon raw material having 20 or fewer carbons is diesel.

9. The method of preparing a light olefin of claim 1, wherein a crystal axis unit cell length a and b of the SBT framework is 17.0 to 18.5 Å.

10. The method of preparing a light olefin of claim 1, wherein a crystal axis unit cell length c of the SBT framework is 41.0 to 42.5 Å.

11. The method of preparing a light olefin of claim 1, wherein catalytic cracking occurs at a reaction temperature of 600° C.

12. The method of preparing a light olefin of claim 1, wherein catalytic cracking occurs at a reaction pressure of 1 bar.

* * * * *